United States Patent [19]

Grünbacher

[11] 4,279,485
[45] Jul. 21, 1981

[54] ELECTROMAGNETIC DRIVE SYSTEM FOR PHOTOGRAPHIC SHUTTERS

[75] Inventor: Martin Grünbacher, Braunfels, Fed. Rep. of Germany

[73] Assignee: Ernst Krull & Co. GmbH, Wetzlar-Nauborn, Fed. Rep. of Germany

[21] Appl. No.: 109,345

[22] Filed: Jan. 3, 1980

[30] Foreign Application Priority Data

Jan. 4, 1979 [DE] Fed. Rep. of Germany ....... 2900197

[51] Int. Cl.³ .......................... G03B 7/083; H01F 7/14
[52] U.S. Cl. ...................................... 354/51; 354/234; 354/267; 335/234
[58] Field of Search ...................... 354/50, 51, 48, 234, 354/235, 266, 267, 29, 43; 335/181, 182, 80, 234

[56] References Cited

U.S. PATENT DOCUMENTS

| 3,048,678 | 8/1962 | Reed | 335/80 |
| 4,171,897 | 10/1979 | Fujita | 354/234 |

FOREIGN PATENT DOCUMENTS 514964  11/1939  United Kingdom .................... 354/234

Primary Examiner—L. T. Hix
Assistant Examiner—Stafford D. Schreyer
Attorney, Agent, or Firm—Gilbert L. Wells

[57] ABSTRACT

An electromagnetic drive system for actuating the shutter blades in photographic devices, preferably in picture taking cameras, comprises a permanent magnet mounted on a magnetically conductive base plate and a first and a second solenoid on either side of the magnet. The coils of the solenoids are electrically connected and are wound in an opposite sense so that the magnetic poles of the solenoids are opposite to one another. A double armed lever is rotatably supported adjacent one pole of the permanent magnet so as to be pivotable between two end positions. In either end position one arm of the lever rests against the core of the first or of the second solenoid and is kept in this position by forces of the magnetic field of the permanent magnet. When a current pulse is conducted through the solenoids the lever is pivoted to its other end position. One arm of the double armed lever is in a driving connection with the shutter blades. During the pivoting movement of the lever the blades are moved to uncover and re-cover the shutter aperture. In a preferred embodiment two drive systems are employed, each actuating one set of shutter blades which, during one exposure, travel only in one direction, whereby extremely short exposure times are achieved.

6 Claims, 20 Drawing Figures

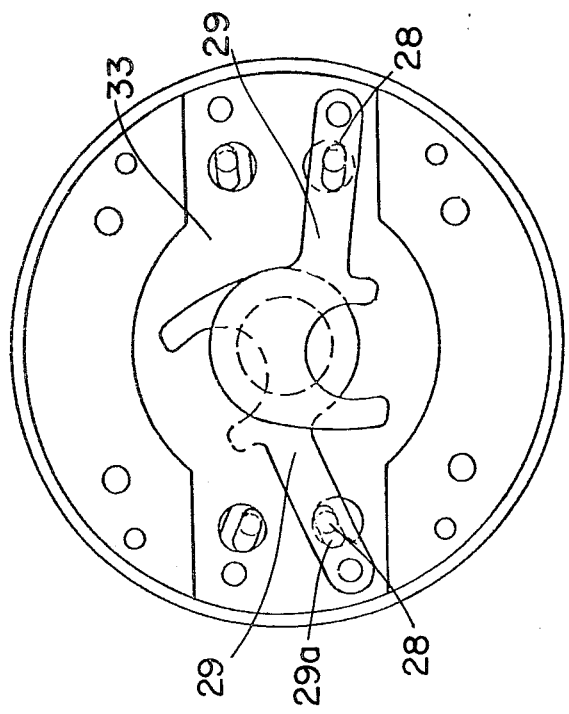
FIG. 17  VIEW CUT ALONG LINE E-F
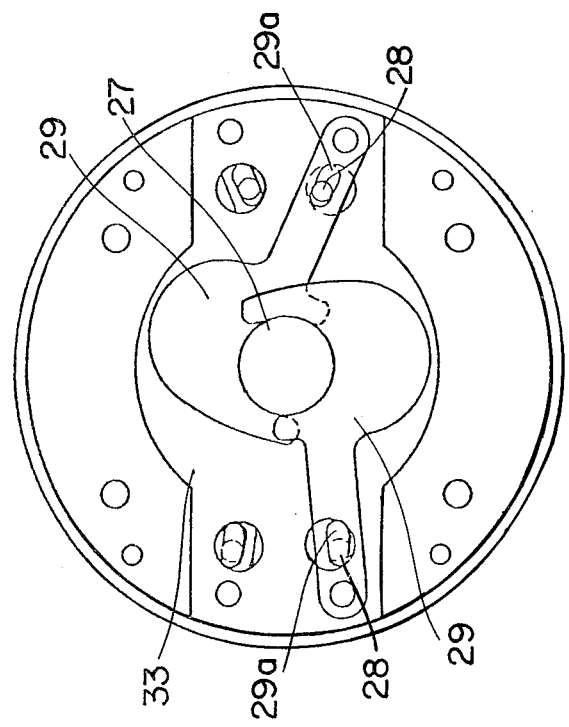
FIG. 16  VIEW CUT ALONG LINE E-F

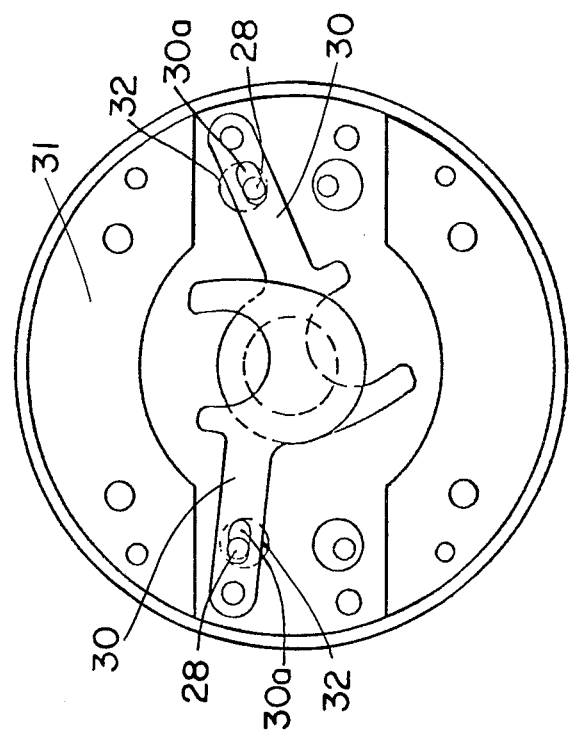
VIEW CUT ALONG LINE G-H   FIG.19
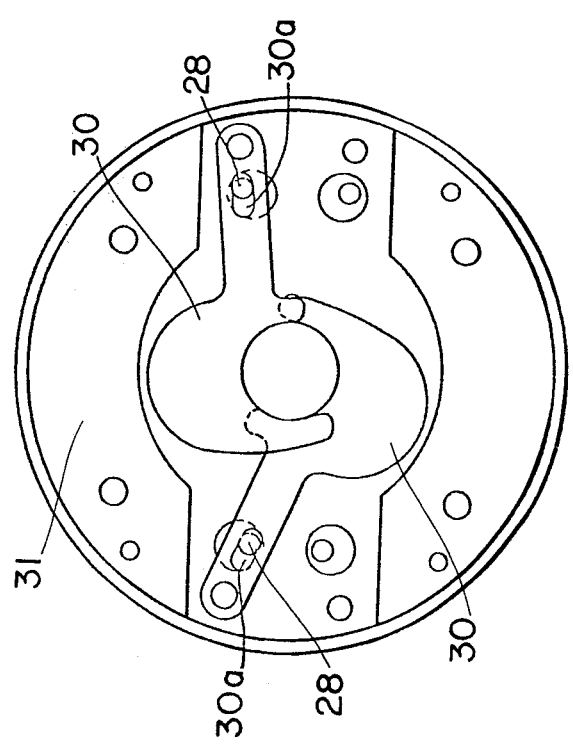
VIEW CUT ALONG LINE G-H   FIG.18

ELECTROMAGNETIC DRIVE SYSTEM FOR PHOTOGRAPHIC SHUTTERS

BACKGROUND OF THE INVENTION

The invention relates to an electromagnetic system for actuating the blades or slides in the shutters of photographic devices, particularly in photographic cameras.

In the field of photographic cameras it is well known to operate the shutter blades by means of one or more electromagnets. The blade actuation may be accomplished in such a manner that the blades are actually driven by the electromagnet, or the shutter construction may be such that the electromagnet is only used for retaining the shutter blades in the shutter open position while spring means are provided which close the shutter when the electromagnet releases the blades at the end of the exposure time upon reception of a pulse from a time control member (RC-circuit).

In such shutters the reaction time of the electromagnet is of decisive importance for an exact exposure time. If, for example, the electromagnet has a reaction time of 2 msec it will be difficult to achieve an exposure time shorter that 1/500 sec. The mentioned reaction time of 2 msec is in fact already a very short time interval. Therefore, substantially shorter exposure times cannot be achieved with the electromagnetic drive systems so far known in the art.

It is, therefore, an object of the invention to provide an electromagnetic drive system for photographic shutters by which very much shorter exposure times, e.g. ½ msec = 1/2000 sec and even shorter may readily be obtained.

SUMMARY OF THE INVENTION

According to the invention this object is achieved by an electromagnetic drive system comprising a permanent magnet and a double armed lever pivotably supported adjacent one pole of and in magnetic connection with the permanent magnet. At least one end of the double armed lever is in a driving engagement with the shutter blades. On either side of the permanent magnet there is arranged one solenoid. The coils of the two solenoids are electrically connected and are wound in an opposite sense. Therefore the N-poles of the solenoids are on opposite sides and, consequently, so are the S-poles. One arm of the double armed lever always rests against the core of one of the solenoids. The permanent magnet and the two solenoids are mounted on a common magnetically conductive base plate so that the magnetic field of the permanent magnet is closed when one lever arm abuts against the core of one of the solenoids. The coils of the solenoids are connected to a voltage source via an electric circuit.

With an electromagnetic drive system of the invented type very short exposure times, down to 1/2000 sec, may be achieved. This is much shorter than will be obtained with the prior art drive systems.

In the invented drive system the double armed lever itself represents one of the poles of the permanent magnet, due to its close location by the side of the magnet. When a current pulse is conducted to the solenoids pulling forces will work on one arm of the double armed lever while, at the same time, pushing forces will affect the other arm of the double armed lever. These forces supplement one another in an ideal manner to form an almost constant revolving momentum. To the same extent that the force decreases on one side because the gap between the first lever arm and the core of the first solenoid becomes wider when the lever is pivoted there increases the force on the other side because the gap between the second lever arm and the core of the second solenoid becomes continuously smaller until it becomes zero, i.e. until the second lever arm abuts against the core of the second solenoid.

It is a particular advantage of the invented drive system that the double armed lever is safely retained with one lever arm in either of its end positions, i.e. in abutment with one solenoid core even if no current flows through the coils of the solenoids. This results from the magnetic field of the permanent magnet.

The field is closed via the core of the solenoid against which the lever arm abuts. A current for the solenoids is therefore needed only during the short time interval when the double armed lever executes its pivoting movement. The invented drive system is, therefore, a very current-saving device.

However it would also be possible to omit the permanent magnet altogether and to rely on the residual magnetism remaining in the double armed lever. But this would clearly be an inferior embodiment.

The invented drive system may be used in different embodiments for actuating the shutter blades of a photographic shutter. For example one single blade may be connected to one arm of the double armed lever. The blade will either cover or uncover the shutter aperture, depending on the position of the double armed lever. Both of the pivoting movements of the lever in the shutter open position and in the shutter closed position are caused by the electromagnetic forces.

In a further embodiment, however, the pivoting movement of the double armed lever in the shutter open position may be accomplished purely by mechanical forces and only the pivoting movement in the shutter closed position may be caused by the electromagnetic forces. This would serve to further cut down the required current.

In a still further embodiment there may be two shutter blades connected to one end of the double armed lever. These two blades cover and uncover jointly the shutter aperture. With this embodiment shutter-open frequencies up to 400 c/s may be achieved when a pulsating current is supplied to the solenoids. Such an embodiment can well be used for cinematographic cameras. It is a particular advantage of such an embodiment that the light flux can be reduced simply by setting the shutter to a shorter exposure time, instead of cutting the light down by means of an extra diaphragm.

In a still further embodiment one arm of the double armed lever can be connected to the rotating blade ring of an interlens shutter. Thus a plurality of shutter blades can be operated by the invented system.

In all these embodiments the pivoting movement of the double armed lever into the shutter open position may be accomplished purely mechanically, as has already been mentioned above.

A preferred embodiment, however, comprises two of the invented drive systems and two sets of shutter blades, each set being assigned to one drive system. In addition thereto a change-over switch is provided for changing the poles of the solenoids after each exposure.

In this embodiment each set of shutter blades executes its movement during the exposure only in one direction, i.e. one blade set uncovers the shutter aperture at the beginning of the shutter open time and the other set of blades re-covers the aperture at the end of the open time. During the following exposure the aperture is uncovered by the blade set which did the closing during the previous shutter run, and so forth. It is of importance that during one shutter run there occurs no reversal in the direction of movement of the blades. This is decisive for actually achieving the short exposure times of which the drive system is capable.

BRIEF DESCRIPTION OF THE DRAWINGS

The invention will be more readily comprehended from the following description when taken in conjunction with the appending drawings, wherein FIG. 16 is a sectional view cut along the line E-F in FIG. 14, showing the blades in the aperture-open position, FIG. 17 is a sectional view cut along the line E-F in FIG. 14, showing the blades in the aperture-closed position, FIG. 18 is a sectional view cut along the line G-H in FIG. 14, showing the blades in the aperture-open position, FIG. 19 is a sectional view cut along the line G-H in FIG. 14, showing the blades in the aperture-closed position.

DESCRIPTION OF THE PREFERRED EMBODIMENTS

Figure 1:
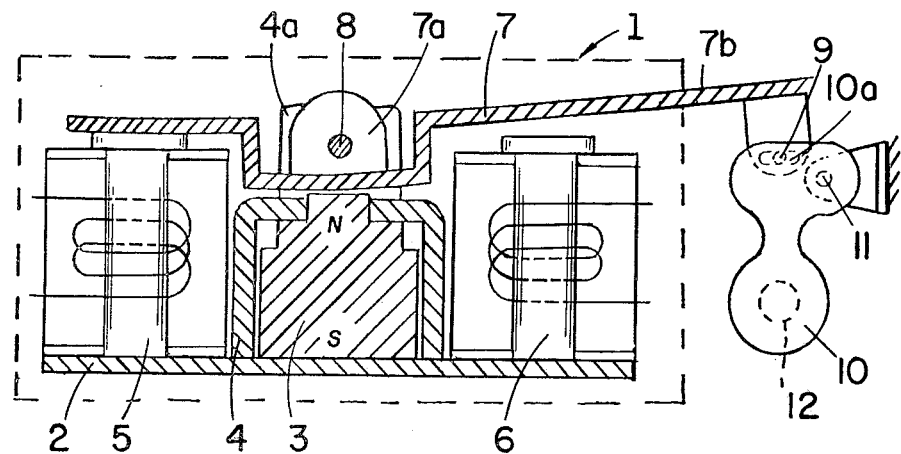
FIG. 1 shows schematically the invented drive system in combination with an electromagnetically released one-blade shutter in the aperture-closed position.

In FIG. 1 the entire drive system enclosed in the dotted line is designated 1. This drive system comprises a base plate 2 on the center of which there is mounted a permanent magnet 3. The latter is secured on the base plate by a yoke 4. The base plate consists of a magnetizable material, the yoke, however, consists of a non-magnetizable material.

On one side of the permanent magnet a first solenoid 5 and on the other side of the permanent magnet a second solenoid 6 is mounted on the base plate. The coils of the two solenoids are electrically connected but are wound in an opposite sense. The winding of the coils and their electric interconnection is shown in FIG. 3.

Figure 3:
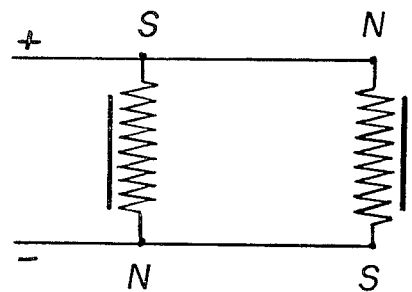
FIG. 3 is an electric circuit showing the coils of the solenoids wound in an opposite sense so that the N-poles and the S-poles of the solenoids are oppositely directed.

From FIG. 3 it can be seen that the coils are connected in parallel. But it is also possible to connect the coils in line. Each coil will then receive only half of the supply voltage.

On the upper side, as shown in the Figure, there is a double armed lever 7 pivotably mounted. The lever extends across the solenoids 5 and 6 and has its pivot adjacent the permanent magnet 3. To this end tabs 4a are bent from the yoke 4 and a pin 8 is secured therein. The lever 7 has also a tab 7a and hinges on the pin 8 by means of said tab 7a.

In its middle portion the lever 7 is formed in u-shape. This middle portion is arranged in such a small distance from the upper pole of the permanent magnet 3 that there exists a flow of the magnetic field lines between the lever and the pole. The gap between the lever and the pole is just wide enough to permit a pivoting motion of the lever from one of its end positions into its other end position.

In both of its end positions the lever 7 rests with one of its arms against the core of either the solenoid 5 or the solenoid 6. FIG. 1 shows the entire drive system at rest and in this position the lever 7 abuts against the core of the solenoid 5. Since, however, the solenoids are mounted with their cores on the magnetically conductive base plate 2 which, in turn, is in conductive connection with the second pole of the permanent magnet 3 there exists a closed flux of magnetic field lines via the solenoid 3. This keeps the lever 7 in abutment with the core of the solenoid 5 even if no current flows through the coil of the solenoid.

If, now, a voltage is supplied to the solenoids and, thus, a current flows through the coils magnetic fields will be built up around the coils. The polarities of these fields are opposite to one another. The polarity of the field around the solenoid 5 is opposite to the polarity of the magnetic field of the permanent magnet 3 while the field around the solenoid 6 has the same polarity as that of the permanent magnet 3. This causes the lever 7 to be pivoted in a clockwise direction. (FIG. 1) because both pushing forces from the magnetic field of the solenoid 5 and pulling forces from the magnetic field of the solenoid 6 affect the lever 7 in the same sense of rotation. These forces are in their magnitude proportional to the width of the air gap between the cores and the arms of the lever 7. At the beginning the gap between the core of the solenoid 5 is zero. Therefore the pushing forces are great at the beginning but become gradually smaller as the gap widens. On the other side the gap between the lever arm and the core of the solenoid 6 is wide at the beginning and, therefore, the pulling forces are small. This gap, however, becomes smaller as a result of the pivoting movement of the lever 7. Consequently the pulling forces will increase as the gap becomes narrower. The pulling forces will reach a maximum when the gap width is zero and the lever arm abuts against the core of the solenoid 6. Thus the pushing forces and the pulling forces complete one another to form a substantially constant torque that pivots the lever.

In the FIGS. 1–11 the N-pole of the permanent magnet 3 is shown to be located at the upper end of the magnet. This is only done by way of example. The drive system would function in the same manner if the S-pole would be the upper one. Only the polarity of the solenoids must then be changed accordingly.

Figure 2:
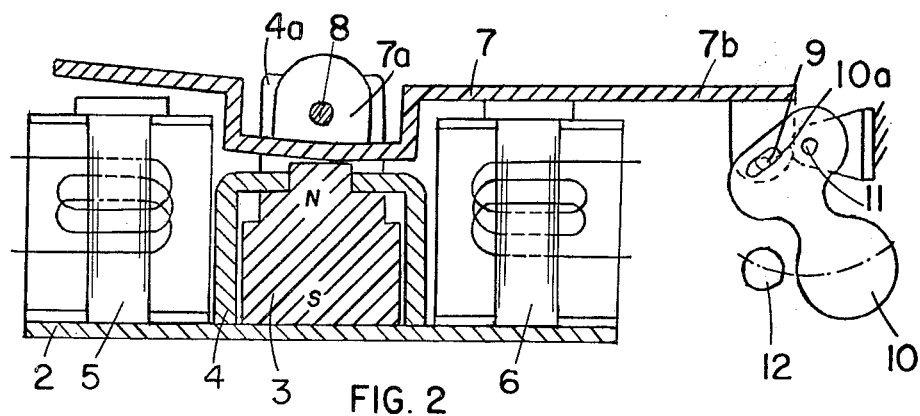
FIG. 2 shows the shutter of FIG. 1 in its aperture-open position.

By conducting a pulse to the coils of the solenoids it is, therefore, possible to pivot the lever 7 in a clockwise sense from its position shown in FIG. 1 to its position shown in FIG. 2. The lever will remain in this end position even if the solenoids are cut off the voltage supply because also in this end position there exists a closed magnetic field via the permanent magnet, the core of the solenoid 6, and the lever 7. In order to pivot the lever back to its first-assumed end position a further electric pulse is required. The current, however, must then flow in the opposite direction than shown in FIG. 3.

A drive system of this type may be used in various embodiments for driving the shutter blades in photographic devices, preferably in photographic picture taking cameras.

The FIGS. 1 and 2 already show schematically a one-blade shutter in driving engagement with the invented system. One arm 7b of the lever 7 is of an elongated shape and is bent at its end. A pin 9 is secured in the bent-over portion and engages an oblong hole 10a in the blade 10. The latter is pivotable about a pin 11 between two end positions and in these end positions covers and uncovers the shutter aperture 12 of an otherwise not shown shutter.

FIG. 1 shows the shutter blade 10 in its closed position. After imparting a first pulse to the solenoids the lever 7 is pivoted to its other end position. By means of the long lever arm 7b and the pin 9 the blade 10 is thereby rotated to its open position in which the light passes through the aperture 12. This is shown in FIG. 2. A second pulse, having opposite polarity, will pivot the blade 10 back to its closed position in which the blade again covers the aperture 12.

In most embodiments, however, the first pulse may be dispensed with. The lever may be pivoted from the closed position to the open position of the shutter by purely mechanical means, such as spring means. Only one pulse is then needed in order to close the shutter again. In a well known manner this pulse may be provided by an electric timing circuit (RC-circuit) which is switched-on synchronously with the opening of the shutter.

An embodiment of this type is shown in the FIGS. 4–7 in combination with the above-described one-blade shutter. On the long arm 7b of the lever 7 there is a leaf spring 13 riveted at 14 to one side of the lever. The other end of the leaf spring 13 is bent to form an oblique surface 13a. The surface works together with a shutter release slide 15 which is slidingly supported on pins 16 by means of elongated holes 17. A spring 18 tends to pull the slide to its left-hand end position.

Figure 4:
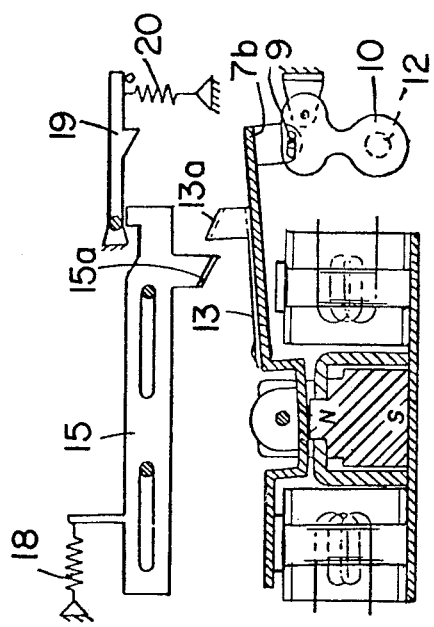
FIG. 4 shows schematically the invented drive system in combination with a mechanically released one-blade shutter in its aperture-closed position prior to the shutter run.
Figure 5:
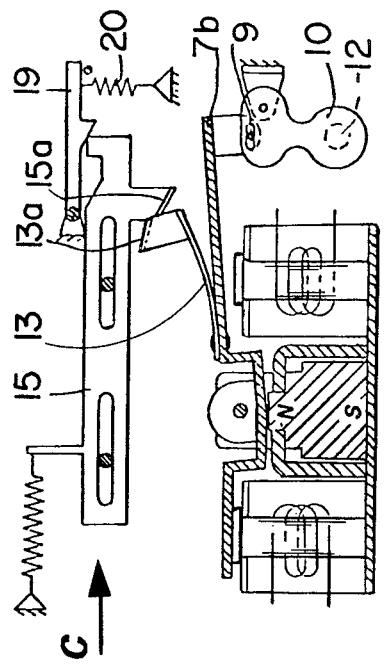
FIG. 5 shows the shutter of FIG. 4 in the aperture-open position.

In its right-hand cocked position the slide 15 is locked by a pawl 19 (FIG. 4). Upon shutter release the pawl 19 is pulled in the direction of the arrow A against the force of a spring 20 and thus comes out of engagement with the slide 15.

The slide 15 is also provided with an oblique bent-over portion 15a. When the slide 15 is released and slides to the left-hand side in the direction of the arrow B the portion 15a abuts against the oblique surface 13a. Thereby the lever 17 is purely mechanically pivoted in a clockwise sense to assume its end position shown in FIG. 5 in which the blade 10 uncovers the aperture 12.

Figure 6:
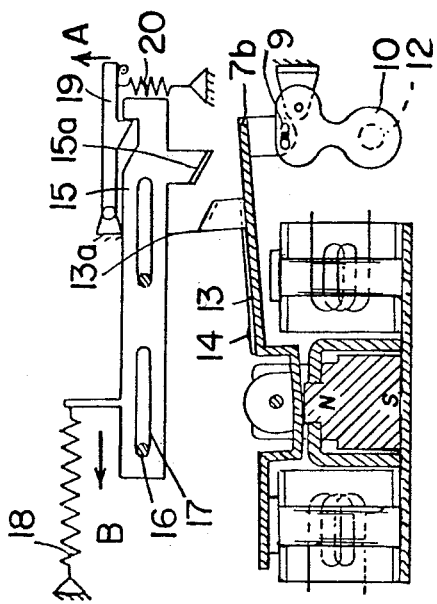
FIG. 6 shows the shutter of FIG. 4 in the aperture-closed position

If then a pulse is provided to the solenoids the lever 7 is pivoted in a counter-clockwise sense to resume its starting position, thereby again closing the aperture 12. This is shown in FIG. 6.

Figure 7:
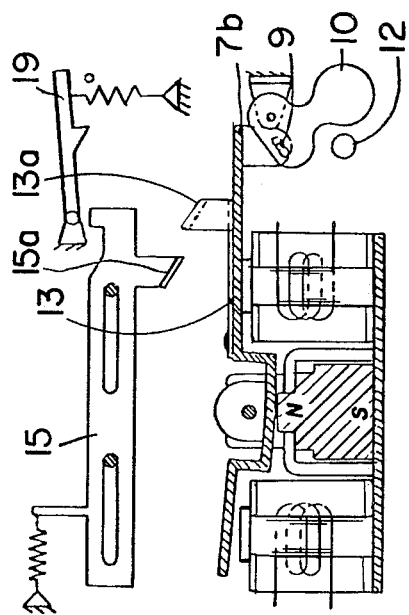
FIG. 7 shows the shutter release slide on its way back to its starting position during cocking.

During the subsequent cocking of the shutter release slide 15—preferably in combination with the film transport—the slide 15 is moved in the direction of the arrow C (FIG. 7). With its oblique portion 15a the slide engages the surface 13a from underneath and lifts the latter to pass under it. This is possible because the surface 13a is a portion of the leaf spring 13 which is slightly lifted during this operation. This is also shown in FIG. 7. In its right-hand end position the slide 15 is again locked by the pawl 19.

Figure 8:
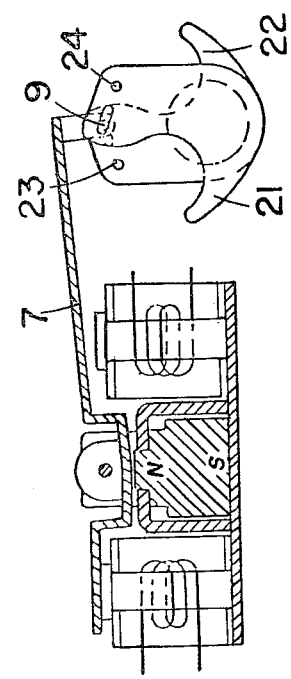
FIG. 8 shows schematically the invented drive system in combination with an electromagnetically released two-blade shutter in the aperture-closed position.
Figure 9:
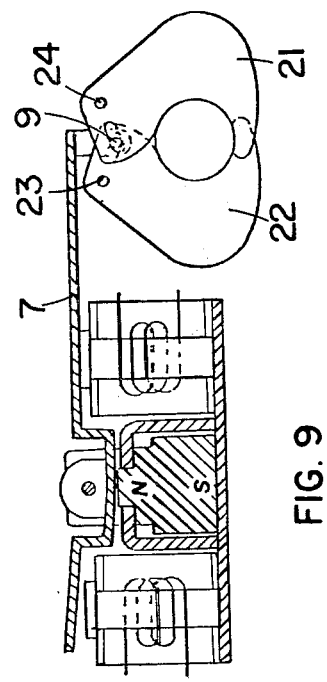
FIG. 9 shows the shutter of FIG. 8 in the aperture-open position.

In the FIGS. 8 and 9 the drive system is shown in combination with a two-blade shutter. From the Figures it will be understood that in this embodiment the pin 9 extends through the elongated holes of two blades 21 and 22 which are pivotably hinged on pins 23 and 24. The shutter is opened when the lever is pivoted from its position shown in FIG. 8 to the position shown in FIG. 9; and the shutter is closed again when the lever 7 is pivoted in the opposite direction.

This shutter may be operated in a pulsating manner. Frequencies up to 400 c/s may be achieved. The shutter may therefore well be used in motion picture cameras. By adjusting the frequency accordingly the exposure time may be regulated in a simple manner so that an extra diaphragm is not required. At least not to the extent that such diaphragm is used for limiting the light passage.

Figure 10:
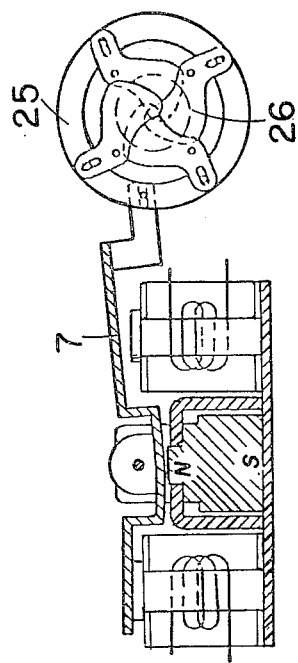
FIG. 10 shows schematically the invented drive system in combination with a shutter comprising a plurality of blades in the aperture-closed position.
Figure 11:
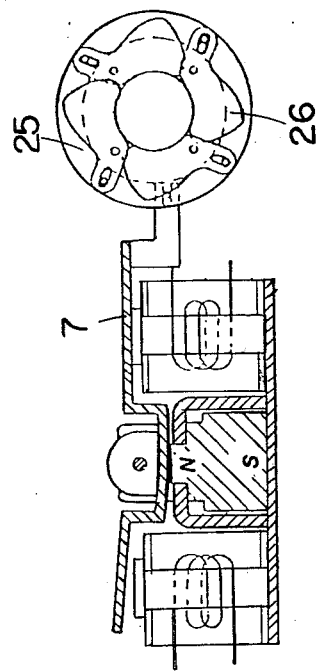
FIG. 11 shows the shutter of FIG. 10 in the aperture-open position.

In the FIGS. 10 and 11 the invented drive system is shown to drive an interlens shutter comprising a plurality of shutter blades. The long arm 7b of the lever 7 is provided with a slot through which a pin extends. The pin is fixed in the movable blade ring 25 of the interlens shutter. When the lever 7 is pivoted it rotates the blade ring 25 in a clockwise and counter-clockwise direction respectively. Thereby the shutter blades are operated to open and close the shutter aperture in the well known manner.

In the FIGS. 12–20 a particular shutter is shown. This shutter is characterized in that two of the invented drive systems are used to operate the shutter blades. Each of the two drive systems operates one blade pair, comprising two blades each. In the one end position of its assigned drive system the blade pair covers the shutter aperture 27 and in the other end position the same blade pair uncovers the aperture.

The shutter operation is such that at the start the first blade pair covers the aperture while the second blade pair is in its open position. The exposure begins by opening the first blade pair that has been closed so far, and the exposure ends by closing the second blade pair that has been open so far. During the subsequent shutter run the action is repeated similarly. Thus, during each shutter run one blade pair only either opens or closes the shutter. The blade pairs do this in an alternating order.

While in the previously described shutters the blades undergo a back and forth movement during each exposure the blades of this preferred shutter type move only in one direction during each exposure. This is essential for achieving extremely short exposure times. According to the length of the blade way, i.e. to the diameter of the aperture, exposure times as short as 0.25 msec may readily be achieved. Even if the diameter of the aperture is larger the exposure time can easily be as short as 0.5 msec = 1/2000 sec. Such short exposure times are required in modern photographic camera shutters.

The shutter shown in the FIGS. 12–20 comprises a first and a second drive system 1. The levers 7 of the two systems 1 have bent-over tabs 7c at their ends wherein pins 28 are fastened. Each pin 28 engages a blade 29 and 30 respectively. There are two blades 29 and two blades 30. Two blades 29 form together the first blade pair and as such pair are assigned to the first drive system 1. Two blades 30 form together the second blade pair and as such are assigned to the second drive system 1.

Figure 14:
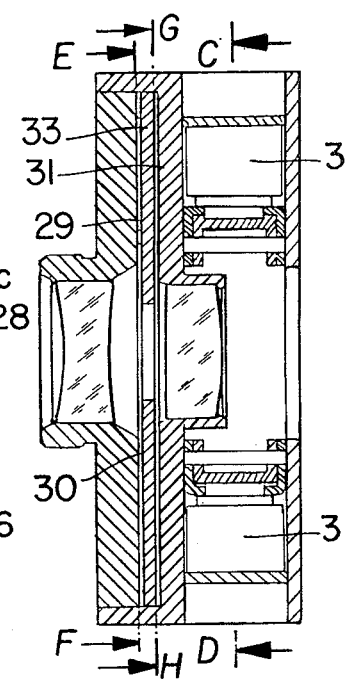
FIG. 14 is a sectional view cut along the line A-B in FIG. 12.

The arrangement of the blade pairs can best be seen from FIG. 14. The permanent magnets 3 of the two drive systems are fixedly mounted on a common aperture plate 31 and the levers 7 are mounted pivotably thereon. The aperture plate has holes 32 (FIG. 19) through which the pins 28 extend for engaging the elongated holes 29a and 30a respectively (FIGS. 16-19) that are provided in the blades. The two pairs of blades are separated from one another by an intermediate layer 33.

In the FIGS. 16 and 17 there is shown a view on the intermediate layer 33 and on the blade pair 29 located in front of the layer. FIG. 16 shows the blade pair in its open position and FIG. 17 shows it in its closed position. This blade pair is operated by the drive system 1 shown in the lower half of the FIG. 12.

The blade pair 30 is arranged in the same manner, as can be seen from the FIGS. 18 and 19. These two FIGS. show a view on the aperture plate 31 with the blade pair 29 and the intermediate layer 33 being removed. The blade pair 30 is also shown in its open position (FIG. 18) and in its closed position (FIG. 19). This blade pair 30 is operated by the drive system 1 shown in the upper half of FIG. 12.

Figure 12:
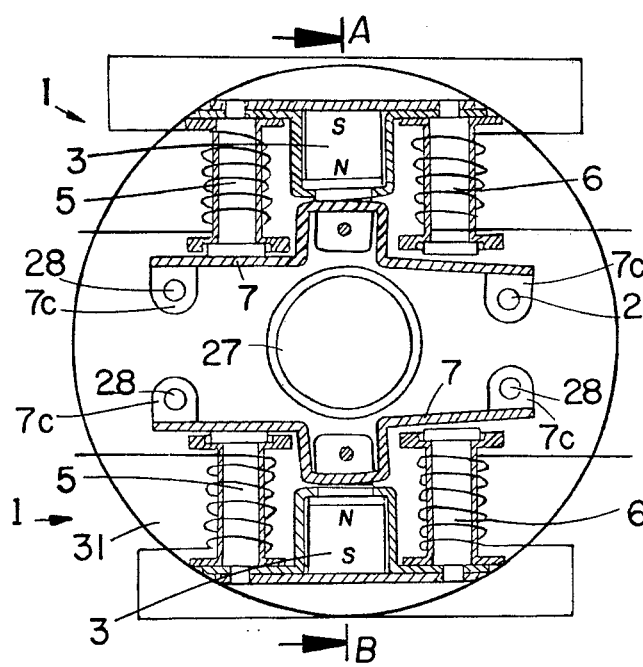
FIG. 12 shows schematically a shutter comprising two of the invented drive systems, each one in combination with a pair of two shutter blades, with the double armed levers in a first end position.

The open positions and closed positions are caused by the pivoting movement of the levers 7, as has been described before. The FIGS. 12 and 13 show the levers 7 of the first and the second drive system in their one end position and then in their other end position.

Figure 13:
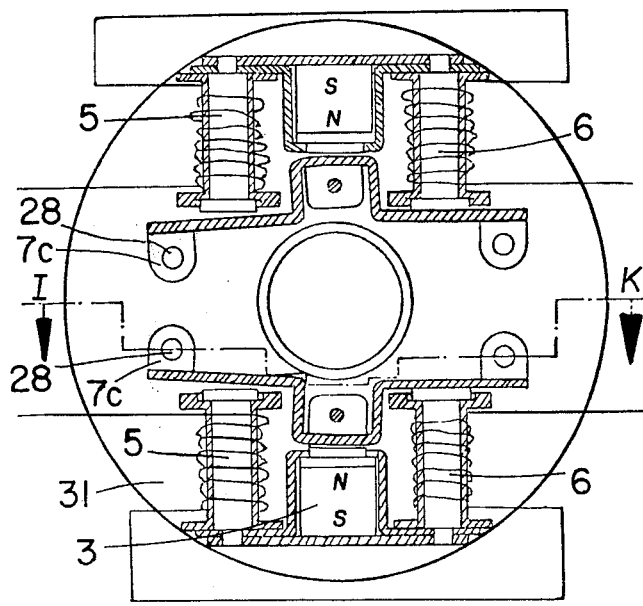
FIG. 13 shows the shutter of FIG. 12 with the double armed levers in the second end position.
Figure 15:
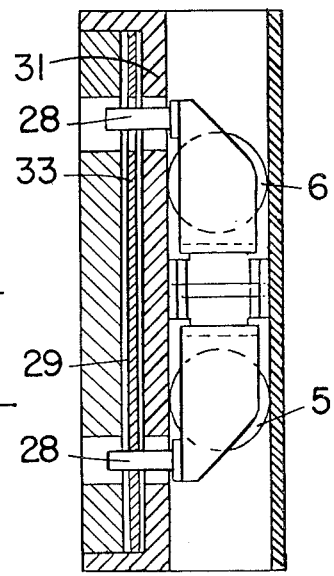
FIG. 15 is a sectional view cut along the line I-K in FIG. 13.

FIG. 15 is a view of a cross section through the shutter shown in FIG. 13. The section extends along the dash-dotted line I-K in FIG. 13. Therefore, FIG. 15 shows only the drive system 1 in the lower half of FIG. 13 with its assigned blade pair 29.

From the FIGS. 12-19 it will be understood how the first and the second drive system are arranged together with their assigned blade pairs and it will be comprehended that the blade pairs alternately cover and uncover the aperture 27 and that during one exposure each blade pair is moved only once and only in one direction.

Figure 20:
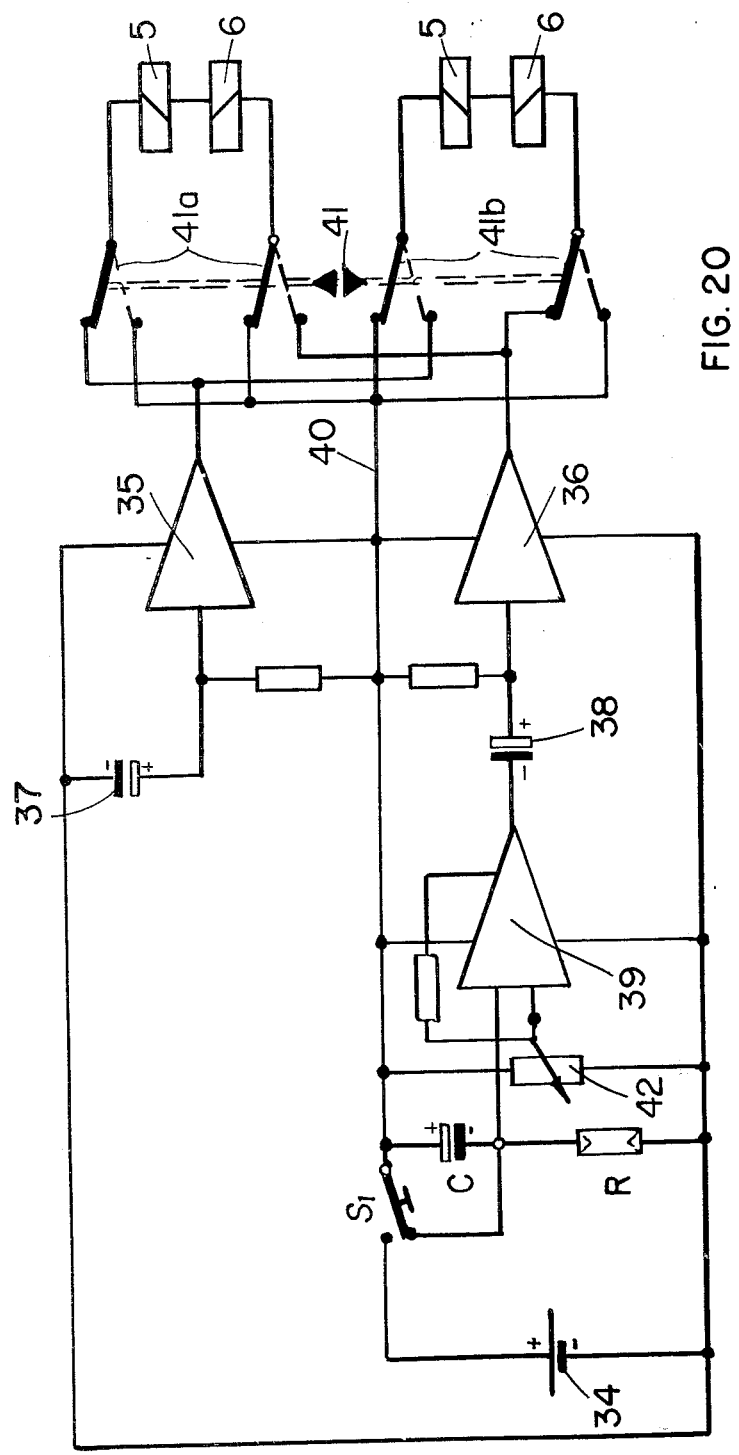
FIG. 20 shows schematically the diagram of the electric circuit for controlling the four solenoids in the shutter shown in the FIGS. 12-19.

The electric circuit which controls this movement is shown in FIG. 20. The Figure shows the solenoids 5 and 6 connected in pairs. The circuit further comprises a voltage source 34 and a main switch $S_1$. The output terminals are two monoflops 35 and 36, and there is also a direct output line 40.

In line with the monoflop 36 there is arranged a comparator 39 which is triggered by an RC-circuit R and C. The threshold value of the comparator can be adjusted by means of a potentiometer 42. The latter may be mechanically connected to the film speed or to the diaphragm setting dial.

Between the solenoid pairs 5 and 6 and the output terminals 35 and 36 of the circuit there is inserted a change-over switch 41 which serves to reverse the direction of the current flow through the coils of the solenoids 5, 6.

The circuit functions as follows:

The main switch $S_1$ is mechanically connected to the shutter release button and will be closed when the button is pressed. This causes a short current pulse to flow via the monoflop 35 through those solenoids 5 and 6 that are connected by the switches 41a of the change-over switch 41. Thereby the shutter will be opened. At the same time the condenser C, which has been short-circuited so far, will be charged by the voltage source 34 via the photoresistor R. Depending on the light intensity prevailing on the photoresistor R the charging will take a longer or a shorter time. When the condenser voltage in C reaches the level of the threshold value to which the comparator 39 has been adjusted a pulse will appear at the output of the comparator and will trigger the monoflop 36. This causes the monoflop 36 to carry for a short time a voltage at its output terminal. A current will thus flow through those solenoids 5 and 6 which are connected by the switches 41b of the change-over switch 41. Thereby the shutter will be closed. The exposure time is thus defined by the time constant of the RC-circuit and the threshold value to which the comparator 39 has been set by means of the potentiometer 42.

The two monoflops 35 and 36 are only used to prevent a continuous current flow through the solenoids and to supply the solenoids with pulses of sufficient magnitude and duration for their operation. This is done to spare the battery.

In order to open the blade pair which is presently in its closed position at the beginning of the following exposure and to close the blade pair which is now in its open position at the end of this following exposure it is necessary to change the direction of the current flow through the solenoids. The general rule is: this particular solenoid-pair 5;6 which operates the blade pair that is to close the aperture must be connected to the RC-circuit-controlled monoflop 36.

This is accomplished by means of the change-over-switch 41. The switch comprises four movable contact fingers connected in two pairs 41a and 41b. The upper pair 41a (in FIG. 20) is assigned to the upper solenoid-pair 5;6 and the lower pair 41b is assigned to the lower solenoid-pair 5;6.

Each of the four contact fingers is movable between two change-over contacts. In the manner shown in FIG. 20 two of the change-over contacts are in connection with the monoflop 35 and two are in connection with the monoflop 36 while the remaining four are connected to the direct output line 40 of the circuit.

From FIG. 20 it can be seen that by switching the change-over switch 41 the two solenoid-pairs 5;6 are alternately connected to the monoflop 35 and then to the monoflop 36. As has been pointed out above, it is essential that in the rest position of the shutter the solenoid-pair of which the assigned blade pair is in its open position is connected to the monoflop 36.

The change-over switch 41 may be actuated manually, for example after each exposure. This, however, would not be very advantageous because it is to be anticipated that the actuation of the switch will often be forgotten. It is therefore suggested to automate the switching act. This can be done by interlinking the switch by means of a gear train, for example, with elements which are moved during the film transport. This will ensure that with every film transport the switch is actually switched-over.

What is claimed is:

1. An electromagnetic drive system for actuating the blades in the shutter of a photographic device to cover and uncover the shutter aperture, comprising
   a—an aperture plate having a shutter aperture,
   b—a first magnetically conductive base plate mounted on the aperture plate on one side of the shutter aperture,
   c—a second magnetically conductive base plate mounted on the aperture plate on the side of the aperture opposite from the first base plate,
   d—a first permanent magnet mounted on the the first base plate,
   e—a first solenoid mounted on the first base plate on one side of the first permanent magnet,
   f—a second solenoid mounted on the first base plate on the opposite side of the first permanent magnet, the coils of the first and the second solenoid being wound in an opposite sense so that the magnetic poles of the first and the second solenoid are opposite to one another,
   e—a double armed lever pivotably supported adjacent one pole of the first permanent magnet so that a magnetic flux exists between the first double armed lever and the first permanent magnet, the lever being pivotable between a first end position and a second end position in either of which one lever arm rests against the core of one solenoid,
   h—a first set of shutter blades for jointly covering and uncovering the shutter aperture, the first set comprising first and second shutter blades, the first blades being in driving engagement with the one lever arm, the second blades being in driving engagement with the other lever arm,
   i—a second permanent magnet mounted on the second base plate,
   j—a third solenoid mounted on the second base plate on one side of the second permanent magnet,
   k—a fourth solenoid mounted on the second base plate on the opposite side of the second permanent magnet, the coils of the third and fourth solenoid being connected and being wound in an opposite sense so that the magnetic poles of the third and fourth solenoid are opposite to one another,
   l—a second double armed lever pivotably supported adjacent one pole of the second permanent magnet so that a magnetic flux exists between the second double armed lever and the second permanent magnet, the lever being pivotable between a first end position and a second end position in either of which one lever arm rests against the core of one solenoid,
   m—an electric circuit connected to the coils of the first, second, third, and fourth solenoid for conducting a first pulse to the first and second solenoid at the beginning of the exposure and for conducting a second pulse to the third and fourth solenoid at the end of the exposure, whereby the shutter aperture is uncovered by the first shutter blades and covered by the second shutter blades, and
   n—switch means for reversing the order of connection of the first and second solenoid and the third and fourth solenoid to the electric circuit after each exposure.

2. The electromagnetic drive system claimed in claim 1, wherein the first and the second shutter blades each comprise a blade pair of two blades, one of each blade being in driving connection with one arm of the first and the second double armed lever.

3. The electromagnetic drive system as claimed in claim 1, wherein the electric circuit includes an RC-circuit comprising a photoelectric resistor for conducting the second pulse to the third and fourth solenoid after a time interval depending on the prevailing light conditions.

4. The electromagnetic drive system claimed in claim 1, wherein the switch means comprise an electric change-over switch.

5. An electromagnetic drive system for actuating blades in the shutter of a photographic device, comprising:
   (a) a magnetically conductive base plate,
   (b) a permanent magnet mounted on the base plate,
   (c) a first solenoid mounted on the base plate on one side of the permanent magnet,
   (d) a second solenoid mounted on the base plate on the opposite side of the permanent magnet, the coils of the first and the second solenoid being wound in an opposite sense so that like magnetic poles of the first and the second solenoid are opposite to one another,
   (e) a double armed lever pivotably supported adjacent one pole of the permanent magnet so that a magnetic flux exists between the lever and the magnet, the lever being pivotable between a first end position and a second end position in either of which positions one lever arm rests against the core of one solenoid,
   (f) shutter blade means mechanically connected to at least one arm of the double armed lever, and
   (g) an electric circuit connected to the coils of the first and the second solenoid for conducting electric pulses to the solenoids, whereby the double armed lever is pivoted from its first end position to its second end position and the shutter blade means are actuated wherein said shutter blade means comprise a single shutter blade in driving engagement with one arm of the double armed lever, the lever assuming a first end position wherein the single shutter blade covers the shutter aperture when no current flows through the coils of the first and the second solenoid, mechanical means in combination with the shutter release mechanism for pivoting the double armed lever to its second end position, whereby the shutter aperture is uncovered by the single shutter blade, and an RC-circuit in connection with the electric circuit for providing a pulse to the first and the second solenoid at the end of the exposure time, whereby the double armed lever is pivoted back to its first end position and the shutter aperture is closed by the single shutter blade, and wherein said mechanical means in combination with the shutter release mechanism comprise:
   (h) a slide movable from a starting position to an end position, (i) an oblique portion in solid connection with the slide,
(j) means for arresting the slide in its starting position,
(k) a leaf spring fixed at one end on the double armed lever,
(l) an oblique surface formed at the other end of the leaf spring, and
(m) spring means for moving the slide from its starting position to its end position upon release of the slide arrest, whereby the oblique slide portion abuts against the oblique spring surface and the double armed lever is pivoted to its second end position.

6. An electromagnetic drive system for actuating blades in the shutter of a photographic device, comprising:
(a) a magnetically conductive base plate,
(b) a permanent magnet mounted on the base plate,
(c) a first solenoid mounted on the base plate on one side of the permanent magnet,
(d) a second solenoid mounted on the base plate on the opposite side of the permanent magnet, the coils of the first and the second solenoid being wound in an opposite sense so that like magnetic poles of the first and the second solenoid are opposite to one another,
(e) a double armed lever pivotably supported adjacent one pole of the permanent magnet so that a magnetic flux exists between the lever and the magnet, the lever being pivotable between a first end position and a second end position in either of which one lever arm rests against the core of one solenoid,
(f) first and second shutter blades mechanically connected to at least one arm of the double armed lever,
(g) an electric circuit connected to the coils of the first and the second solenoid for conducting electric pulses to the solenoids, whereby the double armed lever is pivoted from its first end position to its second end position and the shutter blades are actuated,
(h) an aperture plate having a shutter aperture,
(i) a first drive system mounted on the aperture plate on one side of the shutter aperture,
(j) a second drive system mounted on the aperture plate on the side of the shutter aperture opposite from the first drive system,
(k) said first shutter blades for jointly covering and uncovering the shutter aperture, the first shutter blades being mechanically connected to the double armed lever of the first drive system to cover the shutter aperture in the first end position and to uncover the shutter aperture in the second end position of the double armed lever,
(l) said second shutter blades for jointly covering and uncovering the shutter aperture, the second shutter blades being mechanically connected to the double armed lever of the second drive system to cover the shutter in the first end position and to uncover the shutter aperture in the second end position of the double armed lever,
(m) an electric circuit connected to the coils of the first drive system for conducting a first pulse to the solenoids of the first drive system at the beginning of the exposure and for conducting a second pulse to the solenoids of the second drive system at the end of the exposure, whereby the shutter aperture is uncovered by the first shutter blades and covered by the second shutter blades, and
(n) switch means for reversing the order of connection of the solenoids of the first and the second drive system to the electric circuit after each exposure.

* * * * *